United States Patent [19]
Matsumoto

[11] Patent Number: 5,212,552
[45] Date of Patent: May 18, 1993

[54] HORIZONTAL DEFLECTION CIRCUIT

[75] Inventor: Yoshiaki Matsumoto, Sagamihara, Japan

[73] Assignee: Matsushita Electric Industrial Co., Ltd., Japan

[21] Appl. No.: 729,958

[22] Filed: Jul. 15, 1991

[51] Int. Cl.⁵ .............................................. H04N 3/27
[52] U.S. Cl. .................... 358/158; 358/188; 358/190
[58] Field of Search ............... 358/148, 158, 188, 190; 315/379, 411

[56] References Cited

U.S. PATENT DOCUMENTS

| | | | |
|---|---|---|---|
| 4,673,984 | 6/1987 | Kikuchi et al. | 358/188 |
| 5,124,792 | 6/1992 | Shimaoka | 358/188 X |

FOREIGN PATENT DOCUMENTS

| | | | |
|---|---|---|---|
| 0178900 | 4/1986 | European Pat. Off. | 358/158 |
| 0181658 | 5/1986 | European Pat. Off. | 358/158 |
| 63-152274 | 6/1988 | Japan . | |

Primary Examiner—James J. Groody
Assistant Examiner—David E. Harvey
Attorney, Agent, or Firm—Lowe, Price, LeBlanc & Becker

[57] ABSTRACT

A variable horizontal oscillator oscillates at a frequency dependent on a first control voltage. A horizontal output circuit generates a horizontal deflection current which is synchronous with an oscillation output signal from the variable horizontal oscillator. The horizontal sync frequency of an input video signal is detected. Second and third control voltages are generated which depend on the detected horizontal sync frequency. A dependence of the second control voltage upon the detected horizontal sync frequency differs from a dependence of the third control voltage upon the detected horizontal sync frequency. A power supply voltage to the horizontal output circuit is varied in accordance with the second control voltage. The third control voltage is applied to the variable horizontal oscillator as the first control voltage.

5 Claims, 4 Drawing Sheets

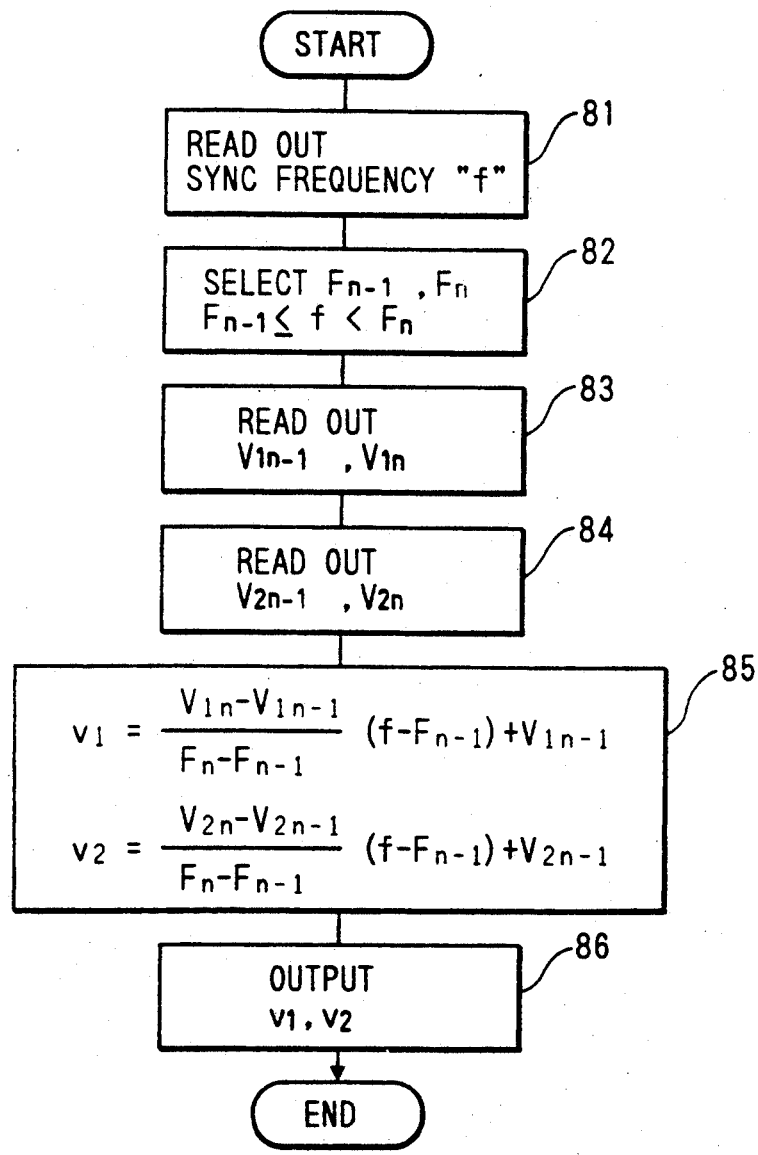

HORIZONTAL DEFLECTION CIRCUIT

BACKGROUND OF THE INVENTION

This invention relates to a horizontal deflection circuit for a display apparatus.

Some advanced display apparatuses can accept video signals having different sync frequencies. In such advanced display apparatuses, deflection frequencies are automatically changed into agreement with the sync frequencies of an input video signal.

Japanese published unexamined patent application 63-152274 discloses a horizontal deflection circuit of such an advanced display apparatus. As will be explained later, the prior art horizontal deflection circuit of Japanese patent application 63-152274 has several problems.

SUMMARY OF THE INVENTION

It is an object of this invention to provide an improved horizontal deflection circuit.

A first aspect of this invention provides a horizontal deflection circuit in a display apparatus for visualizing an input video signal having a changeable horizontal sync frequency, the horizontal deflection circuit comprising a variable horizontal oscillator oscillating at a frequency dependent on a first control voltage; a horizontal output circuit generating a horizontal deflection current which is synchronous with an oscillation output signal from the variable horizontal oscillator; means for detecting the horizontal sync frequency of the video signal; means for generating second and third control voltages which depend on the detected horizontal sync frequency, wherein a dependence of the second control voltage upon the detected horizontal sync frequency differs from a dependence of the third control voltage upon the detected horizontal sync frequency; means for varying a power supply voltage to the horizontal output circuit in accordance with the second control voltage; and means for applying the third control voltage to the variable horizontal oscillator as the first control voltage.

A second aspect of this invention provides a display apparatus for visualizing an input video signal which has a changeable horizontal sync frequency and which has a dwell time equal to a ratio of an image-information period to a horizontal period, the dwell time having a predetermined relation with the horizontal sync frequency, the apparatus comprising means for detecting the horizontal sync frequency of the input video signal; means for estimating the dwell time of the input video signal from the detected horizontal sync frequency of the input video signal; and means for correcting a horizontal deflection in response to the estimated dwell time of the input video signal.

BRIEF DESCRIPTION OF THE DRAWINGS

FIG. 5 is a flowchart of a program operating the microprocessor unit of FIG. 3.

DESCRIPTION OF THE PRIOR ART

Figure 1:
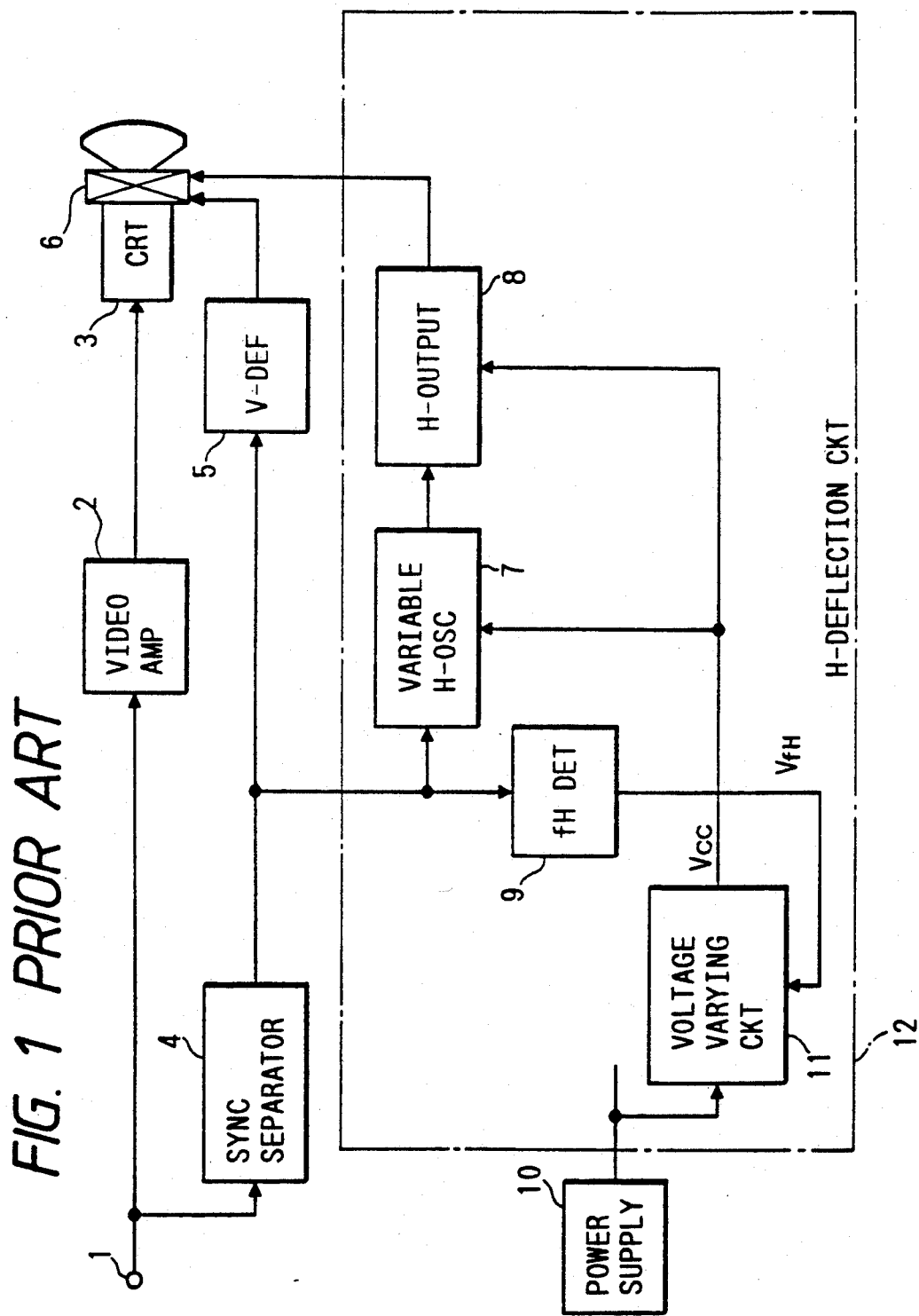
FIG. 1 is a block diagram of a prior art display apparatus.

FIG. 1 shows a prior art horizontal deflection circuit of a display apparatus which is disclosed in Japanese patent application 63-152274. As shown in FIG. 1, the prior art display apparatus includes a video signal input terminal 1, a video amplifier 2, a CRT (a cathode-ray tube) 3, a sync separator 4, a vertical deflection circuit 5, a deflection yoke 6, a variable horizontal oscillator 7, a horizontal output circuit 8, a sync frequency detector 9, a power supply 10, and a voltage varying circuit 11. The variable horizontal oscillator 7, the horizontal output circuit 8, the sync frequency detector 9, and the voltage varying circuit 11 compose a horizontal deflection circuit 12.

A video signal fed to the input terminal 1 is transmitted to the CRT 3 via the video amplifier 2. Image information represented by the video signal is indicated by the CRT 3. The video signal is also applied to the sync separator 4. Vertical and horizontal sync signals are separated from the video signal by the sync separator 4. The separated sync signals are fed to the vertical deflection circuit 5 and the horizontal deflection circuit 12. The vertical deflection circuit 5 drives the vertical deflection winding within the deflection yoke 6 in synchronism with the vertical sync signal, so that vertical deflection is executed in response to the vertical sync signal.

In the horizontal deflection circuit 12, the sync signals are inputted into the variable horizontal oscillator 7 and the sync frequency detector 9.

The sync frequency detector 9 detects the frequency fH of the input horizontal sync signal, and outputs a voltage VfH dependent on the horizontal sync frequency fH. Specifically, the sync frequency detector 9 includes a frequency/voltage converter which outputs a voltage proportional to the frequency of an input signal. The output voltage VfH from the sync frequency detector 9 is fed to the voltage varying circuit 11 as a control voltage. The voltage varying circuit 11 changes the voltage of the power supply 10 into a line voltage Vcc in accordance with the control voltage VfH. The line voltage Vcc is fed to the horizontal output circuit 8 and the variable horizontal oscillator 7 as a control voltage. Thus, the control voltage Vcc varies as a function of the horizontal sync frequency fH. In other words, the control voltage Vcc is uniquely determined by the horizontal sync frequency fH.

The variable horizontal oscillator 7 oscillates at a frequency foH which depends on the control voltage Vcc. Specifically, the oscillation frequency foH of the variable horizontal oscillator 7 is uniquely determined by the control voltage Vcc. Thus, the oscillation frequency foH of the variable horizontal oscillator 7 and the control voltage Vcc can not be independent of each other. Since the control voltage Vcc depends on the detected horizontal sync frequency fH, the oscillation frequency foH of the variable horizontal oscillator 7 can correspond to the detected horizontal sync frequency fH. It should be noted that the horizontal sync signal inputted into the variable horizontal oscillator 7 is fed to a horizontal AFC circuit within the variable horizontal oscillator 7 and is used only for an AFC process.

The horizontal output circuit 8 feeds a sawtooth horizontal deflection current to the horizontal deflection winding within the deflection yoke 6 in synchronism with the oscillation output from the variable horizontal oscillator 7, so that horizontal deflection is executed in response to the oscillation output from the variable horizontal oscillator 7.

In general, the amplitude of the horizontal deflection current tends to vary in accordance with the horizontal deflection frequency due to characteristics of a response of the horizontal deflection winding within the deflection yoke 6 to a sawtooth-waveform signal. Therefore, even in the case where the high voltage applied to the anode of the CRT 3 is held constant, since the horizontal deflection (the horizontal dimension of the raster) depends on the amplitude of the horizontal deflection current, the horizontal deflection (the horizontal dimension of the raster) tends to vary in accordance with the horizontal deflection frequency.

In the prior art horizontal deflection circuit 12, such a dependence of the horizontal deflection upon the horizontal deflection frequency is compensated as follows. The horizontal output circuit 8 adjusts the horizontal deflection voltage in response to the control voltage Vcc which depends on the horizontal sync frequency fH. The adjustment of the horizontal deflection voltage in response to the control voltage Vcc is designed so that the amplitude of the horizontal deflection current can be independent of the horizontal sync frequency fH, that is, the horizontal deflection frequency. This design enables the horizontal deflection (the horizontal dimension of the raster) to be constant independent of the horizontal deflection frequency.

In general video signals, one horizontal period is divided into a raster period and a non-raster period. The prior art horizontal deflection circuit 12 is designed so that the horizontal deflection which occurs during the raster period can be held constant independent of the horizontal deflection frequency. Since one raster period includes a video period (an image or display information period) and a part of a blanking period, the raster period differs from the video period. The image information is indicated on a CRT area, the horizontal dimension of which is determined by the video period. Specifically, the horizontal dimension of an image indication area in the screen of the CRT 3 is determined by a dwell time TD/TH equal to the ratio of one video period TD to one horizontal period TH. In the case of a change between normal television signals having different horizontal sync frequencies but having a common dwell time TD/TH, the horizontal dimension of the image indication area in the screen of the CRT 3 as well as the horizontal dimension of the raster can be held constant by the operation of the prior art horizontal deflection circuit 12.

However, in the case of a change between computer display video signals having different horizontal sync frequencies and also different dwell times TD/TH, although the horizontal dimension of the raster can be held constant, the horizontal dimension of the image indication area in the screen of the CRT 3 can not be held constant by the operation of the prior art horizontal deflection circuit 12.

DESCRIPTION OF THE PREFERRED EMBODIMENT

This invention uses the following fact. In general computer display video signals and other video signals, the dwell time TD/TH has a predetermined relation with the horizontal sync frequency. Specifically, the dwell time TD/TH decreases as the horizontal sync frequency increases in accordance with a predetermined function. In this invention, the horizontal sync frequency is detected, and the dwell time TD/TH is estimated from the detected horizontal sync frequency. In other words, the horizontal sync frequency is detected as an indication of the dwell time TD/TH. The horizontal deflection current is controlled in response to the estimated dwell time TD/TH so that the horizontal dimension of the image indication area in the screen of a CRT can be held constant independent of the dwell time TD/TH. In addition, the control of the horizontal deflection current in response to the dwell time TD/TH causes the horizontal dimension of the raster to increase with an increase in the horizontal sync frequency.

Figure 2:
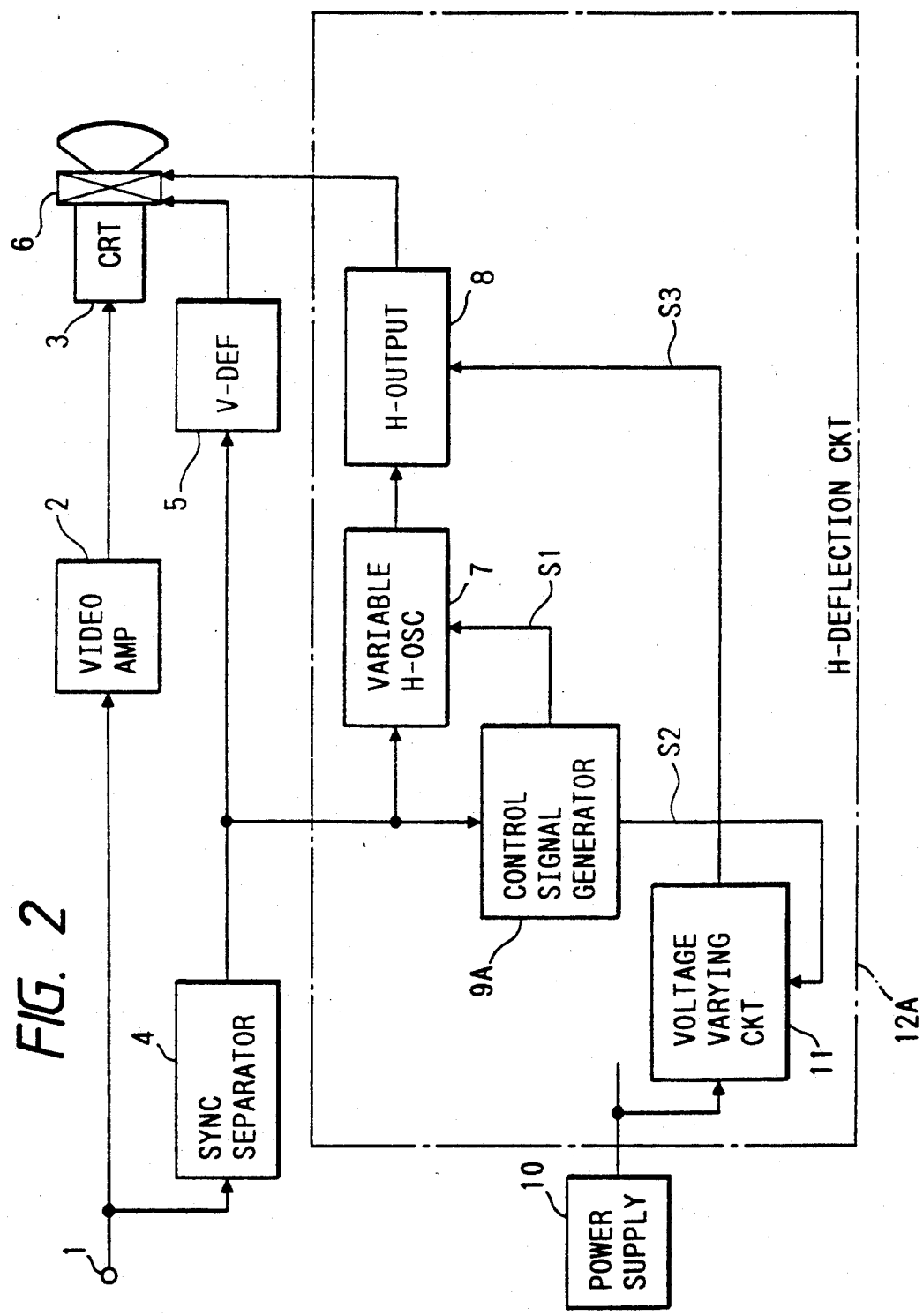
FIG. 2 is a block diagram of a display apparatus including a horizontal deflection circuit according to an embodiment of this invention.

With reference to FIG. 2, a display apparatus includes a video signal input terminal 1, a video amplifier 2, a CRT (a cathode-ray tube) 3, a sync separator 4, a vertical deflection circuit 5, a deflection yoke 6, a variable horizontal oscillator 7, a horizontal output circuit 8, a control signal generator 9A, a power supply 10, and a voltage varying circuit 11. The variable horizontal oscillator 7, the horizontal output circuit 8, the control signal generator 9A, and the voltage varying circuit 11 compose a horizontal deflection circuit 12A.

A video signal fed to the input terminal 1 is transmitted to the CRT 3 via the video amplifier 2. Image information represented by the video signal is indicated by the CRT 3. The video signal is also applied to the sync separator 4. Vertical and horizontal sync signals are separated from the video signal by the sync separator 4. The separated sync signals are fed to the vertical deflection circuit 5 and the horizontal deflection circuit 12A. The vertical deflection circuit 5 drives the vertical deflection winding within the deflection yoke 6 in synchronism with the vertical sync signal, so that vertical deflection is executed in response to the vertical sync signal.

In the horizontal deflection circuit 12A, the sync signals are inputted into the variable horizontal oscillator 7 and the control signal generator 9A.

The control signal generator 9A detects the frequency of the horizontal sync signal fed from the sync separator 4. The control signal generator 9A generates first and second control signals S1 and S2 in response to the detected horizontal sync frequency. The voltage of the first control signal S1 varies as a first predetermined function of the horizontal sync frequency. The voltage of the second control signal S2 varies as a second predetermined function of the horizontal sync frequency. The first and second predetermined functions are different from each other. The first control signal S1 is fed to the variable horizontal oscillator 7. The second control signal S2 is fed to the voltage varying circuit 11.

The first control signal S1 is designed so as to enable the oscillation frequency of the variable horizontal oscillator 7 to follow the horizontal sync frequency.

The second control signal S2 depends on the horizontal sync frequency and also the dwell time of the input video signal. As described previously, the control signal generator 9A detects the frequency of the horizontal sync signal. The control signal generator 9A estimates the dwell time of the input video signal from the detected horizontal sync frequency. The control signal generator 9A generates the second control signal S2 in response to the detected horizontal sync frequency and the estimated dwell time of the input video signal. The second control signal S2 is designed so as to compensate for the intrinsic dependence of the amplitude of the horizontal deflection current upon the horizontal deflection frequency. In addition, the second control signal S2 is designed so as to hold constant the horizontal dimension of the image indication area in the screen of the CRT 3 independent of the dwell time of the input video signal.

As described previously, the second control voltage S2 is fed to the voltage varying circuit 11. The voltage varying circuit 11 changes the voltage of the power supply 10 into a line voltage S3 in accordance with the second control voltage S2. The line voltage S3 is fed to the horizontal output circuit 8 as a control voltage. Since the second control voltage S2 depends on the horizontal sync frequency fH and the dwell time TD/TH of the input video signal, the control voltage S3 varies as a function of the horizontal sync frequency fH and the dwell time TD/TH of the input video signal.

The variable horizontal oscillator 7 oscillates at a frequency foH which depends on the control voltage S1 fed from the control signal generator 9A. Since the control voltage S1 depends on the detected horizontal sync frequency fH, the oscillation frequency foH of the variable horizontal oscillator 7 can correspond to the detected horizontal sync frequency fH. It should be noted that the horizontal sync signal inputted into the variable horizontal oscillator 7 is fed to a horizontal AFC circuit within the variable horizontal oscillator 7 and is used only for an AFC process.

The horizontal output circuit 8 feeds a sawtooth horizontal deflection current to the horizontal deflection winding within the deflection yoke 6 in synchronism with the oscillation output from the variable horizontal oscillator 7, so that horizontal deflection is executed in response to the oscillation output from the variable horizontal oscillator 7.

As described previously, there is an intrinsic dependence of the horizontal deflection upon the horizontal deflection frequency. Such an intrinsic dependence of the horizontal deflection upon the horizontal deflection frequency is compensated as follows. The horizontal output circuit 8 adjusts the horizontal deflection voltage in response to the control voltage S3 which depends on the horizontal sync frequency fH. The adjustment of the horizontal deflection voltage in response to the control voltage S3 is designed so that the amplitude of the horizontal deflection current can be substantially independent of the horizontal sync frequency fH, that is, the horizontal deflection frequency. This design enables the horizontal deflection (the horizontal dimension of the raster) to be constant independent of the horizontal deflection frequency.

In addition, the horizontal dimension of the image indication area in the screen of the CRT 3 can be held constant independent of the dwell time TD/TH of the input video signal as follows. The horizontal output circuit 8 adjusts the horizontal deflection voltage in response to the control voltage S3 which depends on the dwell time TD/TH of the input video signal. The adjustment of the horizontal deflection voltage in response to the control voltage S3 is designed so that the amplitude of the horizontal deflection current which occurs during the video period TD can be independent of the dwell time TD/TH of the input video signal. This design enables the horizontal dimension of the image indication area in the screen of the CRT 3 to be constant independent of the dwell time TD/TH of the input video signal.

Figure 3:
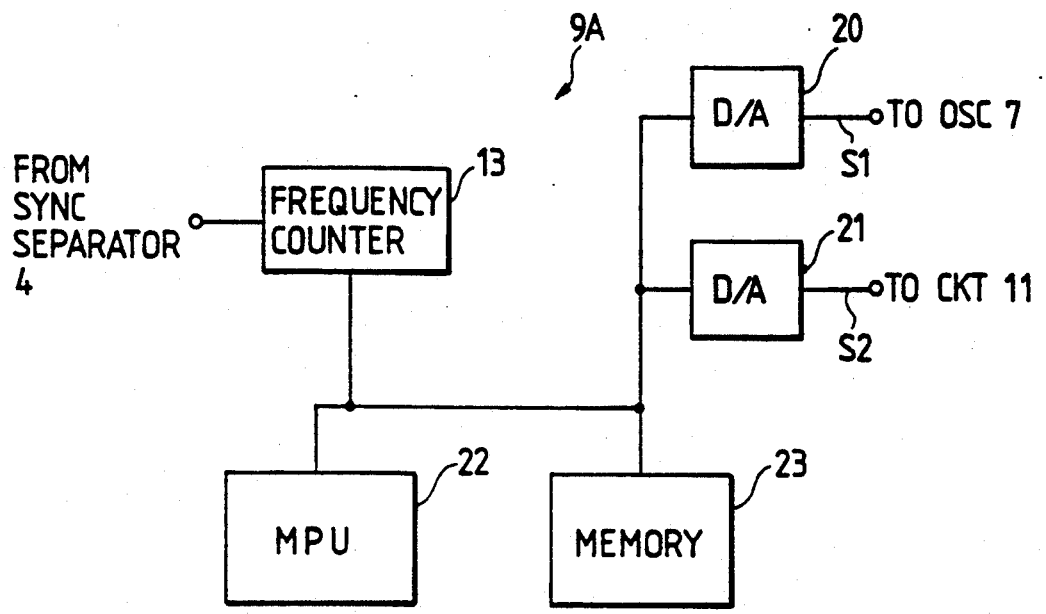
FIG. 3 is a block diagram of the control signal generator of FIG. 2.
Figure 4:
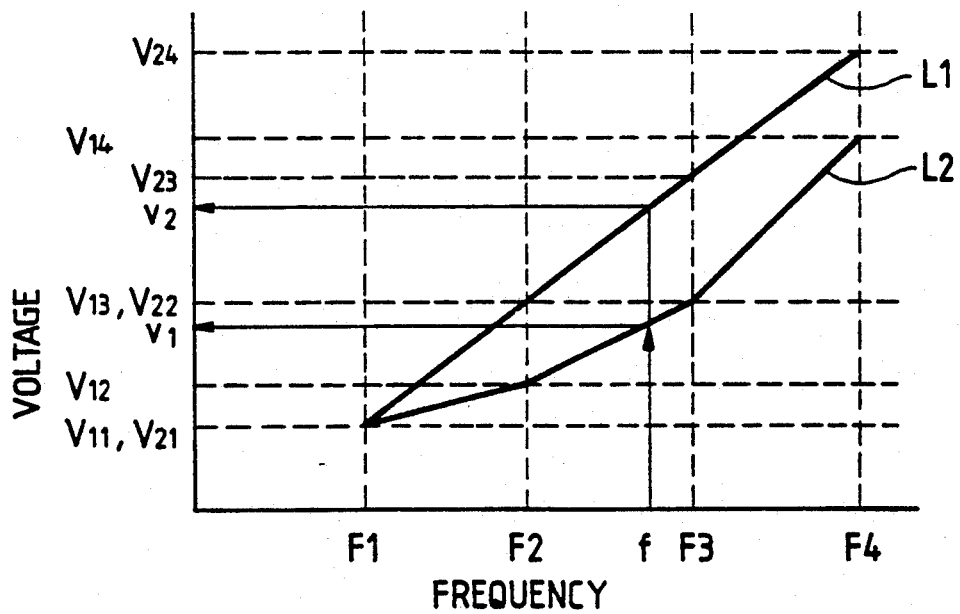
FIG. 4 is a diagram showing the relation among representative horizontal sync frequencies and representative voltages of control signals in the horizontal deflection circuit of FIG. 2.

As shown in FIG. 3, the control signal generator 9A includes a combination of a frequency counter 13, digital-to-analog (D/A) converters 20 and 21, a microprocessor unit (MPU) 22, and a memory 23. The frequency counter 13 receives the horizontal sync signal from the sync separator 4 (see FIG. 2). The frequency counter 13 detects the frequency of the horizontal sync signal, and generates a digital signal representing the detected horizontal sync frequency. The digital horizontal frequency signal is fed to the MPU 22. The memory 23 is composed of, for example, a ROM. The memory 23 stores data of predetermined representative horizontal sync frequencies $F_1$, $F_2$, $F_3$, and $F_4$ which are spaced at equal frequency intervals as shown in FIG. 4. The memory 23 stores data of predetermined representative voltages $V_{11}$, $V_{12}$, $V_{13}$, and $V_{14}$ of the control signal S2 which correspond to the predetermined horizontal sync frequencies $F_1$, $F_2$, $F_3$, and $F_4$ respectively as shown in FIG. 4. The memory 23 also stores data of predetermined representative voltages $V_{21}$, $V_{22}$, $V_{23}$, and $V_{24}$ of the control signal S1 which correspond to the predetermined horizontal sync frequencies $F_1$, $F_2$, $F_3$, and $F_4$ respectively as shown in FIG. 4. The MPU 22 determines desired voltages of the control signals S1 and S2 on the basis of the detected horizontal sync frequency by referring to the data in the memory 23. A linear interpolation process is used in the determination of the desired voltages of the control signals S1 and S2. The MPU 22 outputs digital signals representative of the determined desired voltages of the control signals S1 and S2 to the D/A converters 20 and 21 respectively. The D/A converter 20 converts the input digital signal into a corresponding analog control signal S1 having a voltage equal to the desired voltage. The control signal S1 is fed to the variable horizontal oscillator 7 (see FIG. 2). The D/A converter 21 converts the input digital signal into a corresponding analog signal S2 having a voltage equal to the desired voltage. The control signal S2 is fed to the voltage varying circuit 11 (see FIG. 2).

The MPU 22 includes a combination of a processing section, a RAM, and a ROM. The MPU 22 operates in accordance with a program stored in the ROM. FIG. 5 is a flowchart of the program.

As shown in FIG. 5, a first step 81 of the program reads out the detected horizontal sync frequency "f" from the frequency counter 13. A step 82 following the step 81 operates on the memory 23, and selects two adjacent members $F_{n-1}$ and $F_n$ of the predetermined horizontal sync frequencies $F_1$, $F_2$, $F_3$, and $F_4$ between which the detected horizontal sync frequency "f" is present. In other words, the step 82 selects two adjacent frequencies $F_{n-1}$ and $F_n$ from the predetermined horizontal sync frequencies $F_1$, $F_2$, $F_3$, and $F_4$ which satisfy the relation "$F_{n-1} \leq f < F_n$". A step 83 following the step 82 operates on the memory 23, and reads out two members $V_{1n-1}$ and $V_{1n}$ of the predetermined voltages $V_{11}$, $V_{12}$, $V_{13}$, and $V_{14}$ of the control signal S2 which correspond to the selected horizontal sync frequencies $F_{n-1}$ and $F_n$ respectively. A step 84 following the step 83 operates on the memory 23, and reads out two members $V_{2n-1}$ and $V_{2n}$ of the predetermined voltages $V_{21}$, $V_{22}$, $V_{23}$, and $V_{24}$ of the control signal S1 which correspond to the selected horizontal sync frequencies $F_{n-1}$ and $F_n$ respectively. A step 85 following the step 84 calculates a desired voltage v1 of the control signal S2 from the detected horizontal sync frequency "f", the selected horizontal sync frequencies $F_{n-1}$ and $F_n$, and the readout predetermined voltages $V_{1n-1}$ and $V_{1n}$ by referring to the following interpolation-based equation.

$$v1 = \{(V_{1n} - V_{1n-1})(f - F_{n-1})/(F_n - F_{n-1})\} + V_{1n-1}$$

Specifically, the desired voltage v1 of the control signal S2 is denoted by a point corresponding to the frequency "f" and lying on a preset function line L2 of FIG. 4 which connects the four representative points determined by the frequencies $F_1$, $F_2$, $F_3$, and $F_4$ and the voltages $V_{11}$, $V_{12}$, $V_{13}$, and $V_{14}$. In addition, the step 85 calculates a desired voltage v2 of the control signal S1 from the detected horizontal sync frequency "f", the selected horizontal sync frequencies $F_{n-1}$ and $F_n$, and the readout predetermined voltages $V_{2n-1}$ and $V_{2n}$ by referring to the following interpolation-based equation.

$$v2 = \{(V_{2n} - V_{2n-1})(f - F_{n-1})/(F_n - F_{n-1})\} + V_{2n-1}$$

Specifically, the desired voltage v2 of the control signal S1 is denoted by a point corresponding to the frequency "f" and lying on a preset function line L1 of FIG. 4 which connects the four representative points determined by the frequencies $F_1$, $F_2$, $F_3$, and $F_4$ and the voltages $V_{21}$, $V_{22}$, $V_{23}$, and $V_{24}$. As shown in FIG. 4, the preset function line L1 is different from the preset function line L2. Specifically, the preset function line L1 is essentially straight while the preset function line L2 is curved. A step 86 following the step 85 outputs data of the desired voltage v2 of the control signal S1 to the D/A converter 20, so that the D/A converter 20 outputs the control signal S1 which actually has a voltage equal to the desired voltage v2. In addition, the step 86 outputs data of the desired voltage v1 of the control signal S2 to the D/A converter 21, so that the D/A converter 21 outputs the control signal S2 which actually has a voltage equal to the desired voltage v1.

What is claimed is:

1. In a display apparatus for visualizing an input video signal having a changeable horizontal sync frequency, a horizontal deflection circuit comprising:

a variable horizontal oscillator oscillating at a frequency dependent on a first control voltage;

a horizontal output circuit generating a horizontal deflection current which is synchronous with an oscillation output signal from the variable horizontal oscillator;

means for detecting the horizontal sync frequency of the video signal;

control-signal generating means for generating second and third control voltages which depend on the detected horizontal sync frequency, wherein a dependence of the second control voltage upon the detected horizontal sync frequency differs from a dependence of the third control voltage upon the detected horizontal sync frequency;

means for varying a power supply voltage to the horizontal output circuit in accordance with the second control voltage; and means for applying the third control voltage to the variable horizontal oscillator as the first control voltage, wherein the control-signal generating means comprises:

first memory means for memorizing predetermined different representative horizontal frequencies;

second memory means for memorizing predetermined representative values of the second control voltage which correspond to the representative horizontal frequencies respectively;

third memory means for memorizing predetermined representative values of the third control voltage which correspond to the representative horizontal frequencies respectively;

means for selecting two adjacent members of the representative frequencies, wherein the detected horizontal sync frequency is present between the selected two adjacent representative frequencies;

means, operating on the second memory means, for reading out representative values of the second control voltage which correspond to the selected two adjacent representative frequencies respectively;

means, operating on the third memory means, for reading out representative values of the third control voltage which correspond to the selected two adjacent representative frequencies;

first calculating means for calculating a desired value of the second control voltage from the detected horizontal sync frequency, the selected two adjacent representative frequencies, and the readout representative values of the second control voltage;

means for generating the second control voltage which actually has a level equal to the calculated desired value of the second control voltage;

second calculating means for calculating a desired value of the third control voltage from the detected horizontal sync frequency, the selected two adjacent representative frequencies, and the readout representative values of the third control voltage; and means for generating the third control voltage which actually has a level equal to the calculated desired value of the third control voltage.

2. The horizontal deflection circuit of claim 1 wherein the first calculating means comprises means for calculating the desired value of the second control voltage from the detected horizontal sync frequency, the selected two adjacent representative frequencies, and the readout representative values of the second control voltage in accordance with a first preset interpolation-based function, and wherein the second calculating means comprises means for calculating the desired value of the third control voltage from the detected horizontal sync frequency, the selected two adjacent representative frequencies, and the readout representative values of the third control voltage in accordance with a second preset interpolation-based function which differs from the first preset interpolation-based function.

3. In a display apparatus for visualizing an input video signal having a changeable horizontal sync frequency, an improved horizontal deflection circuit, wherein the improvement comprises:

a circuit for maintaining substantially constant a horizontal dimension of an image displayed by the display apparatus independently of changes in a dwell time of the input video signal, said circuit including:

means for detecting the horizontal sync frequency of the video signal;

generating means for generating first and second different control voltages which depend on the detected horizontal sync frequency, said generating means including first means for generating said first control voltage as a first function of the detected horizontal sync frequency and second means for generating said second control voltage as a second function of the detected horizontal sync frequency, said first and second means differing from each other for generating said first and second control voltages as different functions of the detected horizontal sync frequency;

wherein said second means of said generating means comprises means for storing predetermined voltage levels of said second control voltage corresponding to predetermined horizontal sync frequencies and means for interpolating voltage levels for horizontal sync frequencies between said predetermined horizontal sync frequencies, a variable horizontal oscillator oscillating at a frequency dependent on said first control voltage; and a horizontal output circuit responsive to said second control voltage for generating a horizontal deflection current which is synchronous with an oscillation output signal from the variable horizontal oscillator, wherein said second means of said generating means generates said second control voltage to represent variation of dwell time, defined as a ratio of one video period TD to one horizontal period TH of the horizontal sync frequency, thereby to compensate for variations in amplitude of said horizontal deflection current in dependence on the horizontal sync frequency.

4. In a display apparatus for visualizing an input video signal having a changeable horizontal sync frequency, an improved horizontal deflection circuit, wherein the improvement comprises:

a circuit for maintaining substantially constant a horizontal dimension of an image displayed by the display apparatus independently of changes in a dwell time of the input video signal, said circuit including:

means for detecting the horizontal sync frequency of the video signal;

generating means for generating first and second different control voltages which depend on the detected horizontal sync frequency, said generating means including first means for generating said first control voltage as a first function of the detected horizontal sync frequency and second means for generating said second control voltage as a second function of the detected horizontal sync frequency, said first and second means differing from each other for generating said first and second control voltages as different functions of the detected horizontal sync frequency;

wherein said generating means comprises means for storing predetermined voltage values of said first and second control voltages corresponding to said first and second functions of predetermined horizontal sync frequencies, and means for interpolating voltage values for horizontal sync frequencies between said predetermined horizontal sync frequencies in accordance with said first and second functions, and wherein said first and second means include respective first and second converting means for converting interpolated voltage values to said first and second control voltages, a variable horizontal oscillator oscillating at a frequency dependent on said first control voltage; and a horizontal output circuit responsive to said second control voltage for generating a horizontal deflection current which is synchronous with an oscillation output signal from the variable horizontal oscillator.

5. In a display apparatus for visualizing an input video signal having a changeable horizontal sync frequency, an improved horizontal deflection circuit, the improvement comprising:

a circuit for maintaining substantially constant a horizontal dimension of an image displayed by the display apparatus independently of changes in the horizontal sync frequency of the input video signal, said circuit including:

means for detecting the horizontal sync frequency of the video signal;

generating means for generating first and second different control voltages which depend on the detected horizontal sync frequency, said generating means including first means for generating said first control voltage as a first function of the detected horizontal sync frequency and second means for generating said second control voltage as a second function of the detected horizontal sync frequency, said first and second means differing from each other for generating said first and second control voltages as different functions of the detected horizontal sync frequency, said second means of said generating means including:

means for storing predetermined voltage levels of said second control voltage corresponding to predetermined horizontal sync frequencies, means for interpolating voltage levels for horizontal sync frequencies between said predetermined horizontal sync frequencies, and means for converting the interpolated voltage levels to said second control voltage;

a variable horizontal oscillator oscillating at a frequency dependent on said first control voltage; and a horizontal output circuit responsive to said second control voltage for generating a horizontal deflection current which is synchronous with an oscillation output signal from the variable horizontal oscillator.

* * * * *